United States Patent

[11] 3,632,305

| [72] | Inventor | Leslie C. Hardison<br>Norwalk, Conn. |
|---|---|---|
| [21] | Appl. No. | 784,146 |
| [22] | Filed | Dec. 16, 1968 |
| [45] | Patented | Jan. 4, 1972 |
| [73] | Assignee | Universal Oil Products Company<br>Des Plaines, Ill. |

[54] PROCESS FOR DECONTAMINATING A FLUE GAS SYSTEM
11 Claims, 1 Drawing Fig.

[52] U.S. Cl. .................................................. 23/2 SQ, 23/178 R
[51] Int. Cl. .................................................. B01d 53/34
[50] Field of Search .................................... 23/2, 4, 178, 178 S

[56] References Cited
UNITED STATES PATENTS

| 2,862,789 | 12/1958 | Burgess | 23/178 X |
|---|---|---|---|
| 2,922,735 | 1/1960 | Johnstone | 23/178 X |
| 3,122,594 | 2/1964 | Kielback | 23/2 X |
| 3,320,906 | 5/1967 | Domahidy | 23/178 X |
| 3,386,798 | 6/1968 | Bevans et al. | 23/178 X |
| 3,445,182 | 5/1969 | Tomany | 23/2 |
| 3,475,121 | 10/1969 | Thornton | 23/178 |
| 3,520,649 | 7/1970 | Tomany et al. | 23/2 |

*Primary Examiner*—Earl C. Thomas
*Attorneys*—James R. Hoatson, Jr. and Philip T. Liggett ABSTRACT: A process for reducing the fly ash and sulfur dioxide content of a flue gas stream comprising passing the flue gas through a first mobile-packing scrubber stage to effect collection of the bulk of the fly ash. The flue gas is then passed through subsequent mobile-packing scrubber stages. In these subsequent stages the flue gas is washed with a liquid in which an oxygen-containing compound of magnesium or calcium is present. The sulfur dioxide in the flue gas stream reacts with these compounds and the resulting liquids and solids are carried to a kiln, where the reaction products are decomposed. Sulfur dioxide is driven off and collected, and the magnesium or calcium compound is regenerated for reuse in part.

PATENTED JAN 4 1972          3,632,305
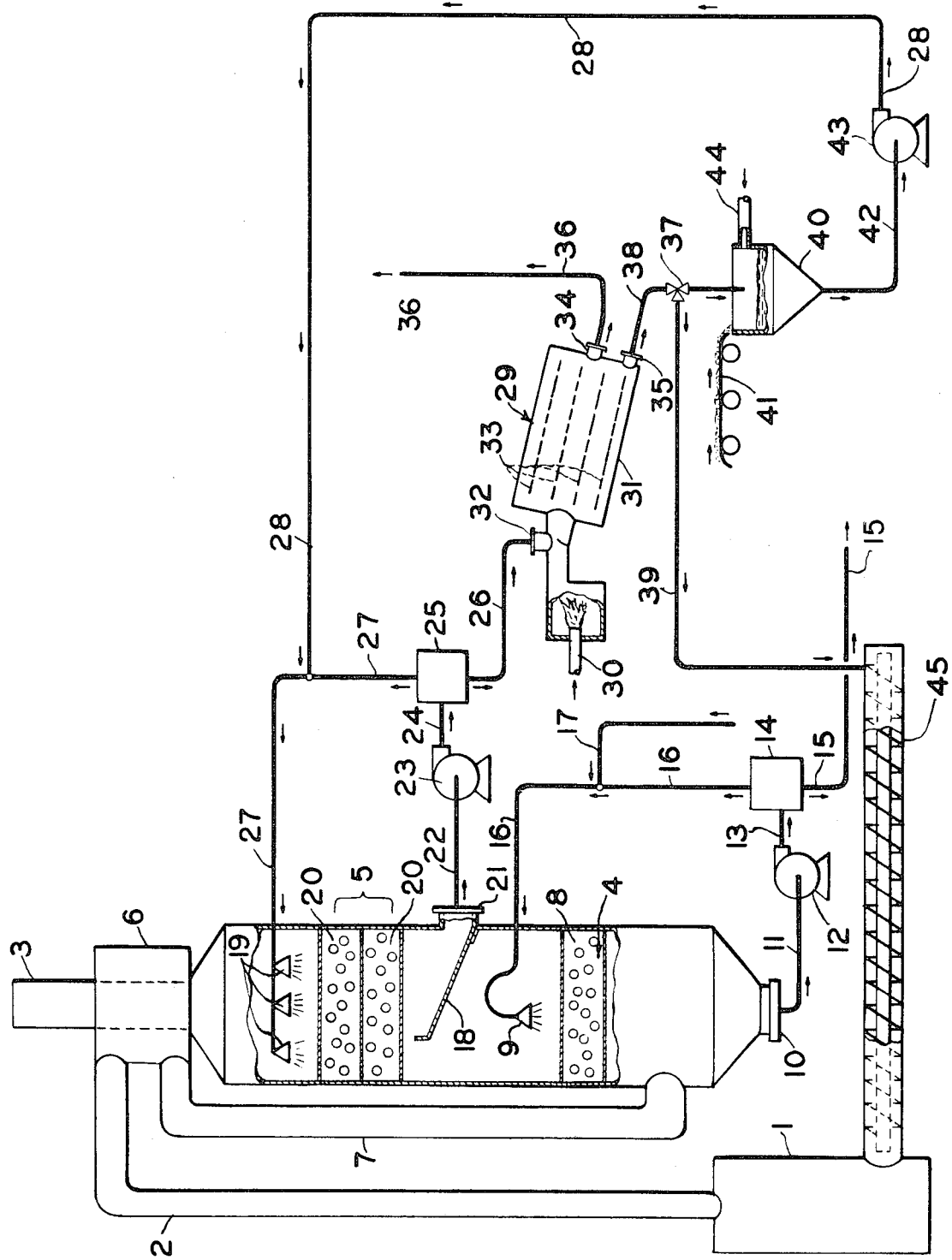
INVENTOR:
LESLIE C. HARDISON
BY: James R. Hoalson, Jr.
    Philip T. Liggett
    ATTORNEYS

PROCESS FOR DECONTAMINATING A FLUE GAS SYSTEM

This invention relates to a method of reducing the fly ash and sulfur dioxide content of a flue gas stream comprising passing the flue gas through a first mobile-packing scrubber stage to effect collection of the bulk of the fly ash. The flue gas is then passed through subsequent mobile-packing scrubber stages. In these subsequent stages the flue gas is washed with a liquid in which an oxygen-containing compound of magnesium or calcium is present. The sulfur dioxide in the flue gas stream reacts with these compounds and the resulting liquids and solids are carried to a kiln where the reaction products are decomposed. The sulfur dioxide is driven off, and the magnesium or calcium compounds are regenerated for reuse in part.

Many methods have been used to reduce either the fly ash content, the sulfur dioxide concentration, or both of a flue gas stream. These conventional methods include centrifugal particle separation, electrostatic precipitation, adsorption, catalytic oxidation, and a variety of other processes. The greatest disadvantage encountered in all such processes is the expense required to effect decontamination. The reason for the expense may stem from the large initial expense of the equipment involved, such as is necessary for an electrostatic precipitator. Other processes can be operated only at a rather large recurring cost, such as adsorption processes in which the adsorbent cannot be regenerated and must continually be replaced. In any conventional system for decontaminating a flue gas, the expense required is not offset by the value of any products produced from the fly ash or contaminating gases.

The primary object of this invention is to reduce the content of sulfur dioxide and fly ash and other solid particles in a flue gas stream at a cost low enough to make such a process commercially attractive. Widespread use of this process will contribute materially to a reduction of commercial air pollution, since sulfur dioxide is one of the most objectionable atmospheric contaminants produced by the combustion of hydrocarbons and other fuel.

Another object of my invention is to minimize erosion in the equipment used to decontaminate a flue gas stream. The greatest portion of the fly ash is removed in the first stage of this process, and entrained fly ash, thereafter, does not have any detrimental effect on any of the subsequent steps in the decontamination process.

A further object of my invention is the production of sulfuric acid. Since the sulfuric acid is produced from a high concentration of sulfur dioxide and after removal of substantially all the fly ash, there is minimal expense required to clean and concentrate the sulfuric acid produced.

An advantage of this invention over existing commercial methods of removing sulfur dioxide from a gas stream is that the material which is used to remove the sulfur dioxide from the flue gas stream is quite abundant and is therefore low in cost. In this new method of decontamination, common materials such as limestone, magnesium oxide, and calcium oxide can be used to effect chemical reaction of the sulfur dioxide, as opposed to other methods which require expensive catalysts, such as vanadium pentoxide or platinum to remove sulfur dioxide. Moreover, a large portion of the calcium or magnesium compounds used to remove sulfur dioxide in this invention are recovered from each cycle which these compounds make through the equipment used in my invention.

This invention can be applied in a number of situations. Besides being practical in any industrial process that burns fuel containing sulfur, including all commercial fuels composed of hydrocarbon to a significant extent, this invention may also be used to remove sulfur dioxide impurities from gas streams which are about to undergo catalytic processing. This application greatly reduces the problem of catalyst "poisoning," that is, the reaction and adsorption of impurities by the catalyst. Sulfur dioxide is particularly prone to "poison" catalysts in the refining of petroleum and petrochemicals and in the production of nitric acid. The reduction of sulfur dioxide in these and other industrial processes in also important in reducing the corrosion of vessels and connecting lines, since corrosion is caused by the sulfur dioxide in exhaust gases passing through these units. Such corrosion is particularly objectionable where extensive processing of exhaust gas is involved, such as where exhaust gas is utilized for heat value, fuel value, or other properties.

In a broad aspect, my invention is a process for decontaminating a flue gas stream comprising the following steps: passing the flue gas stream through a first mobile-packing scrubber stage; disposing of a portion of the liquid and entrained solids withdrawn from the outlet of said first mobile-packing scrubber stage; recycling the remainder of the aforesaid liquid and entrained solids to said first mobile-packing scrubber stage; replenishing the supply of liquid to said first mobile-packing scrubber stage; passing the flue gas stream through subsequent mobile-packing scrubber stages; passing a portion of the liquid and entrained solids withdrawn from the outlet of said subsequent mobile-packing scrubber stages to a kiln; recycling the remainder of the aforesaid liquid and entrained solids to said subsequent mobile-packing scrubber stages; contacting the products of combustion of a fuel firing the aforesaid kiln with the portion of liquid and entrained solids passed to said kiln from said subsequent mobile-packing scrubber stages; withdrawing from said kiln the gases produced by the aforesaid contacting; introducing a portion of the solids produced in said kiln by the aforesaid contacting into a quantity of water; withdrawing the remaining portion of said solids produced in said kiln; introducing an oxygen-containing compound of metal selected from the group consisting of calcium and magnesium into the aforesaid quantity of water; and passing the aforesaid quantity of water containing the aforesaid substances to said subsequent mobile-packing scrubber stages to replenish the supply of liquid used therein.

In many operations, depending upon the initial temperature obtained in the flue gas, it may be desirable to cool the flue gas before passing it through the first mobile-packing scrubber stage. When the initial flue gas temperature is greater than 350°, such a cooling step is desirable to bring the temperature of the flue gas down to at least about 350° F. This cooling step, though not essential to the successful operation of this invention, is desirable to keep vaporization of the scrubbing liquid at a minimum in the first mobile-packing scrubber stage. If the temperature of the flue gas stream is kept at or below 350° F. as the flue gas enters the first mobile-packing scrubber stage, 95 percent of the fly ash present in the flue gas stream can be expected to be removed by the first mobile-packing scrubber stage.

The first mobile-packing scrubber stage is comprised of a vertical column with a liquid outlet at the bottom and a flue gas stream inlet near the bottom. Above the flue gas inlet are trapped a multiplicity of spheres. The specific embodiments of mobile-packing scrubber stages may vary considerably, but all are characterized as having an upflow of gas contacting a downflow of scrubbing liquid in a scrubbing bed. The scrubbing bed contains a quantity of small spheres which are caused to rotate by the conflicting forces of the contacting fluids. Use of the spheres provides a large surface of contact upon which the gas is cleaned by the scrubbing liquid. The rotation of the spheres has a self-cleaning effect which prevents the scrubber stage from becoming clogged with impurities separated from the gas to be cleaned.

Some mobile-packing scrubber stages utilize a large number of low-density spheres. These spheres are usually constructed of polyethylene or polypropylene about 1½ inches in diameter, and in some types of mobile-packing scrubber stages form a layer about 4 inches deep between two transverse wide mesh screens or grids, between which the low-density spheres are trapped. Above the screens in the column is located a spray head which sends a spray of scrubbing liquid downward into the bed of trapped spheres. The gas to be cleaned enters the gas inlet near the bottom of the column and travels upward through the sphere bed while scrubbing liquid cascades down from the sprayer head at the top. Gas and liquid are thereby brought into thorough interphase contact, not only on the wetted surfaces of the spheres, but throughout the entire active zone. This contact provides ample opportunity for particulates and soluble gases to be absorbed by the liquid. The moving spheres are continuously cleaned by tumbling against one another, thereby effectively preventing solids buildup and eliminating plugging or channeling. The same contacting and cleansing effect is achieved to a lesser degree in beds in which the spheres are of a higher density. In this case, the interphase contacting occurs near the lower retaining screen and the upper screen is unnecessary. In yet another type of mobile-packing scrubber stage, a much smaller number of low-density spheres are trapped between two transverse wide mesh screens. This increases the zone area in which the spheres operate and permits the use of extremely high gas and liquid flow rates through the unit, while retaining the advantages of random, turbulent sphere motion. This particular type of mobile-packing scrubber stage is exemplified by the Turbulent-Contact Absorber, as described in Douglas, U.S. Pat. No. 3,350,075. Since there are various other modifications and constructions of mobile-packing scrubber stages, those embodiments heretofore discussed may be considered typical rather than vital to the success of this invention.

Regardless of which embodiment of mobile-packing scrubber stage is chosen, the cleaned gas arises past the spray head and through an overhead outlet in the column. While the scrubbing liquid and entrained solids are withdrawn through the liquid outlet in the lower portion of the first mobile-packing scrubber stage, a portion of the scrubbing liquid is withdrawn for disposal while the remaining portion is recycled by a pump or other means to the sprayer head. The portion of liquid which is recycled is combined with a replenishing supply of scrubbing liquid prior to discharge into the column. The replenishing supply should normally be regulated to compensate for the scrubbing liquid withdrawn for disposal and that portion of liquid entrained in the flue gas stream and passed through the overhead outlet. This combination of recycled liquid containing the entrained particles and the fresh scrubbing liquid, dilutes the pollution of the recycled scrubbing liquid to allow additional gases and fly ash and other suspended solids to be trapped in the liquid and withdrawn through the liquid outlet on subsequent passes through the first mobile-packing scrubber stage. This feature of combining polluted with unpolluted liquid is especially advantageous when prior to separation into recycling and disposal portions, the liquid is passed into a concentrator. A concentrator is a device that concentrates many of the suspended solid particles into one portion of the scrubbing liquid. The scrubbing liquid withdrawn for disposal is drawn from the portion in which the bulk of the suspended solids are concentrated. The liquid which is recycled is drawn from that portion of liquid in which the suspended solids are not concentrated.

The simplest form of concentrator is a cavity in a line used to convey the scrubbing liquid. The cavity is larger than the diameter of the pipe used to convey the scrubbing liquid. The concentrator is normally located downstream from the pump which is used to force the liquid through the system. As the liquid enters the cavity, it slows in velocity, since the cross-sectional area of the cavity is greater than that of the pipe through which the liquid entered the cavity. As the liquid velocity diminishes, the suspended solids tend to settle to the bottom of the cavity. It is from this portion of the cavity that a portion of a scrubbing liquid is withdrawn for disposal. An overhead line leads from the upper portion of the cavity to the sprayer head. The pump thereby forces this less polluted portion of scrubbing liquid into a recycle to the first mobile packing scrubber stage.

As the flue gas stream emerges from the first mobile-packing scrubber stage, it is channeled into similar subsequent mobile-packing scrubber stages. There may be one or any greater number of subsequent mobile-packing scrubber stages, and each stage may either be in a separate column or separate beds of low-density spheres may be vertically aligned in a single column. In the subsequent mobile-packing scrubber stages, the scrubbing liquid is normally water with an oxygen containing compound of magnesium or calcium dissolved or entrained therein. As the flue gas stream ascends through the beds of spheres, the water, the calcium or magnesium compounds, the sulfur dioxide, and the entrained solids are contacted. Most of the remaining fly ash and other entrained solid material is carried by the scrubbing liquid through the liquid outlet or outlets in the lower portion of the column or columns. In the subsequent mobile-packing scrubber stages the calcium or magnesium compounds contact and react with the sulfur dioxide to form either calcium bisulfite or magnesium bisulfite, which is drained off with the scrubbing liquid. The liquid withdrawn is split into a stream for recirculation and a stream leading to a kiln. For greater efficiency, a concentrator is used to the same advantage as is the concentrator used in conjunction with the first mobile-packing scrubber stage. The portion of the scrubbing liquid to be recycled is drawn from that portion of the concentrator in which solids are not concentrated and is joined with a replenishing supply of water containing oxygen compounds of calcium or magnesium. This mixture is then pumped to the sprayer heads of the subsequent mobile-packing scrubber stages.

When a concentrator is used in conjunction with the subsequent mobile-packing scrubber stages, the composition of that portion of liquid drawn from the section of the concentrator in which solids are concentrated is about 50 percent slurry of fly ash and calcium or magnesium compounds in water. This slurry is emptied into the top of a kiln in contact with the products of combustion of the fuel firing the kiln. These products of combustion are normally comprised largely of water vapor and carbon dioxide. The water vapor and carbon dioxide react with the magnesium bisulfite or the calcium bisulfite carried from the subsequent mobile-packing scrubber stages to form magnesium oxide or calcium oxide while driving off sulfur dioxide gas and water vapor. The heat in the kiln evaporates the water from the scrubbing liquid to a vapor. The sulfur dioxide and water vapor are thereafter withdrawn from the kiln as gases. The sulfur dioxide may be combined with the water vapor to produce sulfuric acid. The sulfuric acid may subsequently be used to manufacture sulfur. The solids collected from the kiln are comprised largely of magnesium oxide or calcium oxide, along with the small amount of the fly ash which remains entrained in the flue gas stream throughout the first mobile-packing scrubber stage and which is withdrawn with the scrubbing liquid of the subsequent scrubber stages and carried to the kiln from the concentrator.

A portion of the solids recovered from the kiln by contacting the products of combustion of the fuel firing the kiln and the scrubbing liquid and entrained solids are introduced into a quantity of water. The remaining portion may either be discarded, withdrawn and introduced into said first mobile-packing scrubber stage, or withdrawn and introduced into the flue gas stream before the flue gas stream passes through said first mobile-packing scrubber stage. The quantity of water into which the aforesaid portion of recovered solids is introduced is further enriched with oxygen-containing compounds of magnesium or calcium by the direct addition of such compounds from a source outside the system. The quantity of water, to which the aforesaid solids has been added, is passed to the sprayer heads of the subsequent mobile-packing scrubber stages to replenish the supply of scrubbing liquid therein. The oxygen-containing compounds of magnesium or calcium added to the aforesaid quantity of water may be magnesium oxide, magnesium carbonate, calcium oxide, or calcium carbonate. These compounds form, to at least some extent, either magnesium hydroxide or calcium hydroxide when added to the quantity of water as described. After any of these compounds complete one cycle through the subsequent mobile-packing scrubber stages, they are all oxidized to either magnesium oxide or calcium oxide and form magnesium hydroxide or calcium hydroxide when passed from the kiln and added to the quantity of water.

The implementation of this invention may be further illustrated in the accompanying drawing.

Referring now to the drawing, a flue gas is produced by burning coal in a furnace 1. The flue gas stream produced passes up through duct 2. Duct 2 leads to a heat transfer collar 6 positioned around exhaust stack 3 so that the flue gas stream escaping through exhaust stack 3 is heated and the flue gas stream passing through duct 2 and collar 6 is cooled prior to passing into duct 7. The result of this arrangement is that the flue gas stream enters the first mobile-packing scrubber stage 4 at a substantially lower temperature than initially is attained in furnace 1. This in turn results in less vaporization of scrubbing liquid in first mobile-packing scrubber stage 4 and in the subsequent mobile-packing scrubber stages 5. The flue gas stream rising from exhaust stack 3 is heated so that it rises above the surrounding ambient air, and thus any pollutants left in the flue gas stream are dissipated well above ground level.

The flue gas stream passes from duct 7 into first mobile-packing scrubber stage 4. In first mobile-packing scrubber stage 4 the gas stream passes through a contacting bed 8, which is comprised of a quantity of polyethylene spheres retained between two large mesh screens. Water is sprayed into first mobile-packing scrubber stage 4 from sprayer head 9. This water traps most of the fly ash in the flue gas stream and carries it out through liquid outlet 10 and into a pipe 11 which carries the scrubbing liquid and entrained solids to a pump 12. Pump 12 forces the scrubbing liquid through a pipe 13 into a concentrator 14. In concentrator 14, the velocity of the flowing scrubbing liquid and entrained solids is slowed, and the entrained solid fly ash particles tend to settle in the lower portion of concentrator 14. The resulting slurry is drained for disposal through pipe 15. At the same time, the portion of scrubbing liquid with less entrained particles is forced by pump 12 up a pipe 16 leading to sprayer head 9 in first mobile-packing scrubber stage 4. Before reaching sprayer head 9, pipe 16, carrying the recycled scrubbing liquid, is joined by pipe 17, which carries a replenishing supply of scrubbing liquid. This replenishing supply of scrubbing liquid compensates for the scrubbing liquid drawn off for disposal through pipe 15 as well as the liquid which is entrained in the rising flue gas stream.

A baffle 18 is located above first mobile-packing scrubber stage 4 and separates first mobile-packing scrubber stage 4 from subsequent mobile-packing scrubber stages 5 and prevents most of the scrubbing liquid from subsequent mobile-packing scrubber stages 5 from descending into first mobile-packing scrubber stage 4. From first mobile-packing scrubber stage 4 the flue gas stream passes baffle 18 and ascends into subsequent mobile-packing scrubber stages 5, each of which are quite similar to first mobile-packing scrubber stage 4. In the illustrated embodiment, all mobile-packing scrubbing stages are located within a single column. Sprayer heads 19 spray scrubbing liquid from pipe 27 down onto contacting beds 20, which like bed 8, each contain a quantity of polyethylene spheres retained between two large mesh screens. The scrubbing liquid descends through contacting beds 20 where contact with the rising flue gas stream takes place. The rising flue gas stream causes a random turbulent motion among the spheres and effects a high mass transfer between the scrubbing liquid and the flue gas stream. Most of the remaining fly ash is entrapped in the scrubbing liquid and is carried out liquid outlet 21. Since the scrubbing liquid used in subsequent mobile-packing scrubber stages 5 contains an oxygen-containing compound of magnesium or calcium, the sulfur dioxide in the flue gas stream reacts with the calcium or magnesium compounds to form calcium bisulfite or magnesium bisulfite. These resulting compounds are likewise carried in the scrubbing liquid through liquid outlet 21. From liquid outlet 21, the scrubbing liquid, with the entrained particles and the calcium or magnesium compounds is carried by pipe 22 to pump 23. Pump 23 forces the liquid and solids through a pipe 24 to a concentrator 25. Some of the calcium and magnesium compounds which may form exist in part as undissolved solids in concentrator 25. Typical of these compounds are calcium sulfite, magnesium sulfite, calcium hydroxide, magnesium hydroxide, calcium carbonate, and magnesium carbonate. In concentrator 25 the velocity of the flowing liquid is slowed, and the entrained solid fly ash particles and any undissolved calcium or magnesium compounds tend to settle in the lower portion thereof. The resulting slurry is drained through pipe 26 to kiln 29. The slurry of scrubbing liquid passing through pipe 26 is comprised of water, fly ash, and dissolved and undissolved magnesium compounds, calcium compounds, or both. Kiln 29 is a conventional rotary kiln, but may be any conventional kiln or drying means. At one end of kiln 29 a fuel jet 30 burns a gaseous hydrocarbon as a fuel. The products of combustion, which are exhaust gases, travel axially along the length of the kiln toward a slurry feed or inlet 32. Inlet 32 is the opening through which a slurry is fed into kiln 29 and the point at which the slurry first contacts the exhaust gases from the fuel. The other end of the kiln 29 is comprised of a rotating shell 31 having flights 33, a gas outlet 34, and a particle outlet 35. Shell 31 is sloped toward outlets 34 and 35, so that the fuel exhaust gases and the slurry proceed axially toward the outlets of the kiln. Flights 33 lift the slurry so that as the shell rotates the water and solid particles are dropped into the exhaust gases, thereby effecting greater contact between the slurry and the exhaust gases. Flights 33 extend radially toward the center of shell 31 only a short distance from the walls of shell 31, and longitudinally throughout the length of shell 31. The contact resulting from the action of flights 33 and from the heat of the exhaust gases evaporates the water in the kiln and decomposes the calcium bisulfite and magnesium bisulfite present. This decomposition results in sulfur dioxide being produced as a gas and in magnesium and calcium being oxidized to magnesium oxide and calcium oxide. The gases are exhausted from kiln 29 through gas outlet 34 into pipe 36 which leads to facilities producing sulfuric acid from the sulfur dioxide present in the gas. The solids present at this point include a small amount of fly ash, calcium oxide or magnesium oxide, and possibly other solids in granular or powder form. These solids flow through particle outlet 35 into pipe 38 to three-way valve 37. There, a portion of the solid particles are conducted into pipe 39 while the balance of these solids are introduced into a vat 40 which contains a quantity of water and which is fed water by a replenishing stream 44. A conveyor stream 41 introduces quantities of an oxygen-containing compound of either magnesium, calcium, or both into vat 40. The water, containing the solids conducted from kiln 29 and those introduced by conveyor system 41, are carried from vat 40 by pipe 42 through pump 43, which pumps this material as a replenishing supply of scrubbing liquid into pipe 28. This liquid with dissolved and entrained solids eventually is discharged into the subsequent mobile-packing scrubber stages 5 through sprayer heads 19. The remaining solids from pipe 38 flow through a branch of three-way valve 37 to a pipe 39, and are conveyed to furnace 1 by a screw conveyor 45.

The following examples will further illustrate this invention.

EXAMPLE I

One hundred pounds of coal are burned in a furnace. The exhaust gases produced contain 0.3 percent sulfur dioxide and a trace of sulfur trioxide and 10 pounds of entrained fly ash, the balance of the exhaust gas being comprised of carbon dioxide and water vapor. These products of combustion are cooled to 350° F. and are passed through a first mobile-packing scrubber stage, wherein water is the scrubbing liquid. In the first mobile-packing scrubber stage, 9.5 pounds of the fly ash are removed by the liquid. This fly ash is concentrated in a concentrator and a slurry containing 60 percent fly ash by weight is withdrawn from the concentrator for disposal. The remaining portion of the scrubber liquid and suspended solids are recycled to the first mobile-packing scrubber stage. The flue gas stream passes to subsequent mobile-packing scrubber stages, wherein practically all of the remaining fly ash is removed. The scrubbing liquid used in these subsequent mobile-packing scrubber stages is water containing 1 percent magnesium hydroxide by weight. About 50 percent of the sulfur dioxide present is combined with the magnesium hydroxide present in the subsequent mobile-packing scrubber stages to form magnesium bisulfite. The water, fly ash, magnesium bisulfite, and remaining magnesium hydroxide is withdrawn and passed through a concentrator. In the concentrator a slurry comprising 50 percent by weight dissolved magnesium hydroxide and fly ash along with water and magnesium bisulfite is withdrawn and introduced into a rotary kiln, where the water is evaporated and all the combined sulfur dioxide is driven off and collected for sulfuric acid production. About 15 percent of the solid material emerging from the kiln is separated and returned for injection into the first mobile-packing scrubber stage at a point below the level of that of low-density spheres. The remaining portion of solid material is passed into a vat of water. Sufficient magnesium carbonate to replace the magnesium compounds injected into the first mobile-packing scrubber stage is added to the vat of water and reacts with the water to form magnesium hydroxide. This brings the magnesium compound content of the scrubbing liquid back to a concentration of 1 percent, which is the concentration desirable for the scrubbing liquid in the subsequent mobile-packing scrubber stages.

EXAMPLE II

The process of example I differing only in that magnesium oxide is added to the vat of water instead of magnesium carbonate. To improve efficiency, carbon dioxide, in addition to the magnesium oxide, is bubbled into the vat to create a slightly acidic solution. This increases the solubility of the magnesium oxide to the extent necessary to bring the content of magnesium compounds back up to a 1 percent concentration. As the magnesium oxide is dissolved in the water it reacts to form magnesium hydroxide. In the subsequent mobile-packing scrubber stages dissolved magnesium hydroxide reacts with the sulfur dioxide present to form magnesium bisulfite.

EXAMPLE III

The process of example I differing only in that calcium carbonate is added to the vat of water instead of magnesium carbonate. The calcium carbonate dissolves to form calcium hydroxide in the water instead of magnesium hydroxide, and the dissolved calcium hydroxide reacts with the sulfur dioxide present in the subsequent mobile-packing scrubber stages to form calcium bisulfite. The calcium hydroxide is maintained at a nominal concentration of 1 percent.

EXAMPLE IV

The process of example II differing only in that calcium oxide is added to the vat of water instead of magnesium oxide. The calcium oxide reacts with the carbon dioxide and water to form dissolved calcium hydroxide. In the subsequent mobile-packing scrubber stages the dissolved calcium hydroxide reacts with the sulfur dioxide present to form calcium bisulfite.

In all cases the drawing and examples used as illustrations shall not be construed as limiting this invention thereto. The relative proportions of magnesium or calcium compounds in the scrubbing liquid, the quantities of sulfur dioxide and fly ash produced, and the efficiency of sulfur dioxide and fly ash removal shall not be considered limited. Neither shall the types of mobile-packing scrubber stages used nor the other means employed to implement this invention be considered limited to that described or illustrated in the drawing.

I claim:

1. A process for decontaminating a flue gas stream containing entrained fly ash and sulfur dioxide and utilizing a first mobile-packing scrubber stage, subsequent mobile-packing scrubber stages, and a kiln, comprising the following steps:

a. introducing hereinafter specified recycle and additional water to said first mobile-packing scrubber stage and passing the flue gas stream through said first mobile-packing scrubber stage thereby removing a major portion of the entrained fly ash from said flue gas stream and producing a quantity of water having entrained solids therein;

b. disposing of a portion of the water and entrained solids passed from said first mobile-packing scrubber stage;

c. recycling the remainder of the aforesaid water and entrained solids to said first mobile-packing scrubber stage;

d. supplying additional water to said first mobile-packing scrubber stage, thereby replenishing the water supply thereto;

e. introducing hereinafter specified replacement water to said subsequent mobile-packing scrubber stages and passing the flue gas stream from step (a) through said subsequent mobile-packing scrubber stages, therein removing a large portion of the sulfur dioxide and more fly ash from said flue gas stream, and producing a quantity of water having entrained solids therein;

f. passing a portion of the water and entrained solids withdrawn from said subsequent mobile-packing scrubber stages to said kiln;

g. recycling to said subsequent mobile-packing scrubber stages the remainder of the aforesaid water and entrained solids withdrawn therefrom;

h. burning a fuel to fire the aforesaid kiln, thereby producing gaseous products of combustion;

i. contacting said gaseous products of combustion with that portion of water and entrained solids passed to said kiln from said subsequent mobile-packing scrubber stages, thereby evaporating the water and producing gases and solids in said kiln;

j. withdrawing from said kiln the gases produced therein;

k. introducing a portion of the solids produced in said kiln into a quantity of replacement water;

l. withdrawing from said kiln the remaining portion of the solids produced therein;

m. introducing into the aforesaid quantity of replacement water an alkaline earth metal compound selected from the group consisting of magnesium oxide, magnesium carbonate, magnesium hydroxide, calcium oxide, calcium carbonate, and calcium hydroxide; and, n. passing the aforesaid quantity of replacement water containing the aforementioned substances of said subsequent mobile-packing scrubber stages to replenish the water supply therein, thereby enabling the sulfur dioxide in the flue gas stream to react in said subsequent mobile-packing scrubber stages with the aforesaid alkaline earth metal compound dissolved and entrained in the water supply therein.

2. The process of claim 1 further characterized in that said alkaline earth metal compound is magnesium oxide.

3. The process of claim 1 further characterized in that said alkaline earth metal compound is magnesium carbonate.

4. The process of claim 1 further characterized in that said alkaline earth metal compound is calcium carbonate.

5. The process of claim 1 further characterized in that said alkaline earth metal compound is calcium oxide.

6. The process of claim 1 wherein said portion of liquid and entrained solids passed from said outlet of said subsequent mobile-packing scrubber stages to a kiln follows a separate path and is kept separate from the portion of liquid and entrained solids withdrawn from the outlet of said first mobile-packing scrubber stage.

7. The process of claim 1 further characterized in that said liquid and entrained solids from said first mobile-packing scrubber stage are passed through a concentrator, and that portion of said liquid in which the aforesaid entrained solids are concentrated is removed for disposal and the remaining portion of said liquid and entrained solids is recycled to said first mobile-packing scrubber stage.

8. The process of claim 1 further characterized in that said liquid and entrained solids from said subsequent mobile-packing scrubber stages are passed through a concentrator, and that portion of said liquid in which the entrained solids are concentrated is passed to said kiln and the remaining portion of said liquid and entrained solids is recycled to said subsequent mobile-packing scrubber stages.

9. The process of claim 1 further characterized in that the remaining portion of said solids produced in said kiln is withdrawn and is introduced into said first mobile-packing scrubber stage.

10. The process of claim 1 further characterized in that the remaining portion of said solids produced in said kiln is withdrawn and is introduced into the flue gas stream before the flue gas stream passes through said first mobile-packing scrubber stage.

11. The process of claim 1 further characterized in that the flue gas stream is cooled to at least about 350° F. before it is passed through said first mobile-packing scrubber stage.

* * * * *